United States Patent [19]

Kobayashi et al.

[11] 4,298,117
[45] Nov. 3, 1981

[54] APPARATUS FOR DISCHARGING ARTICLES FROM CONVEYOR BELTS

[75] Inventors: Takuo Kobayashi, Nishinomiya; Yasuyuki Takashima, Osaka, both of Japan

[73] Assignee: Sandvik Conveyor GmbH, Fellbach, Fed. Rep. of Germany

[21] Appl. No.: 34,763

[22] Filed: Apr. 30, 1979

Related U.S. Application Data

[63] Continuation of Ser. No. 824,120, Aug. 12, 1977, abandoned.

[30] Foreign Application Priority Data

May 21, 1976 [JP] Japan .................................. 51-59327

[51] Int. Cl.³ ........................ B65G 47/46; B65G 47/74
[52] U.S. Cl. ................................... 198/367; 198/599; 198/637; 271/303
[58] Field of Search ............... 198/367, 599, 442, 796, 198/597, 451, 358, 491, 492, 633–637; 271/64, 173, 303

[56] References Cited

U.S. PATENT DOCUMENTS 1,990,050 2/1935 Schenk et al. .................. 198/599 X
3,666,080 5/1972 Alfredsson .......................... 198/350

Primary Examiner—Robert B. Reeves
Assistant Examiner—Douglas D. Watts
Attorney, Agent, or Firm—Harold L. Stults; William S. Frommer

[57] ABSTRACT

Apparatus for diverting articles from a belt conveyor at an article-discharge zone, wherein a diverter is moved from a position at the side of the belt to a position wherein it extends at an angle to the direction of movement of the belt transversely of the belt in the path of movement of the articles. The diverter is pivotally mounted to swing through an angle from its retracted position along one side of the belt to its extended position in which it extends across the conveyor at an angle so that articles encounter it and are diverted from the conveyor. The axis of the pivotal movement of the diverter is at the upstream edge of the article-discharge zone and is so positioned that the path of the downstream end of the diverter moves along an arc which intersects the near edge of the belt substantially opposite or downstream from the point where that arc intersects the far edge of the belt.

11 Claims, 7 Drawing Figures

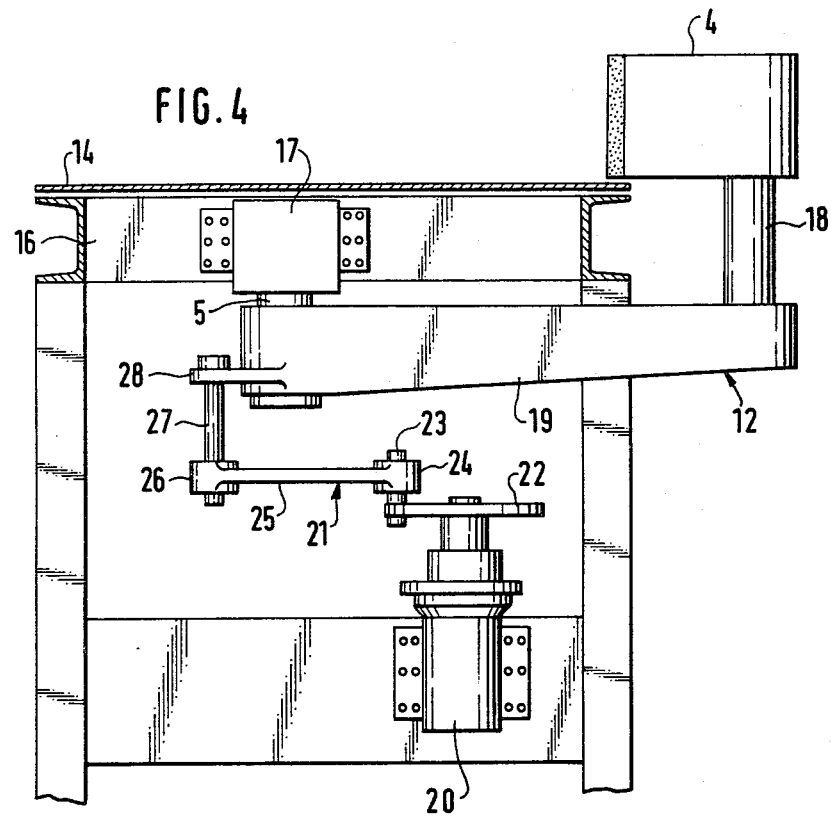
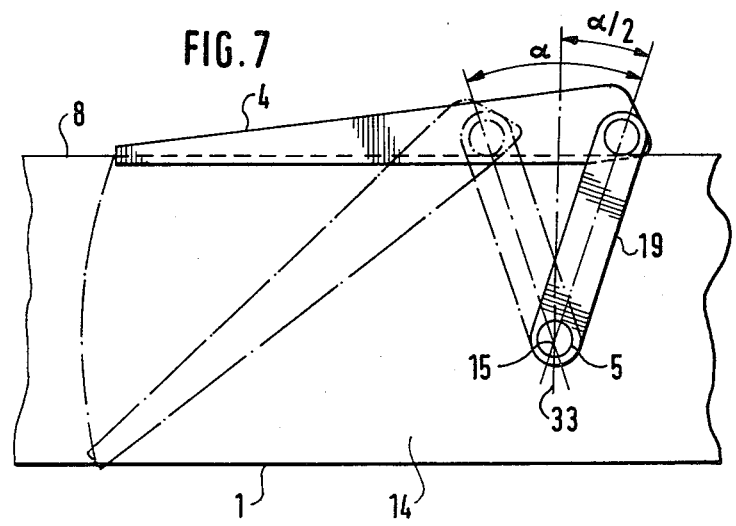

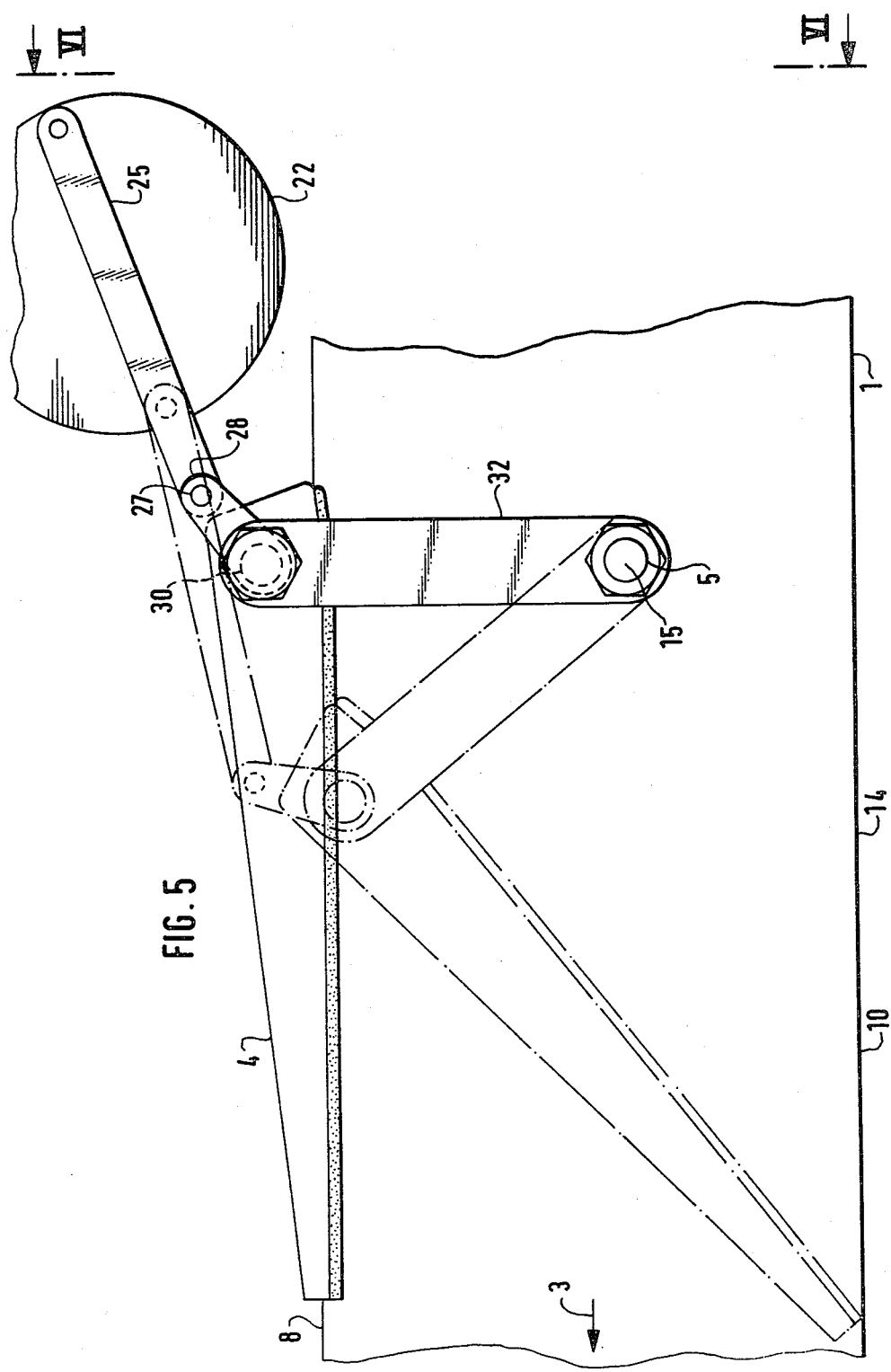

APPARATUS FOR DISCHARGING ARTICLES FROM CONVEYOR BELTS

This is a continuation, of application Ser. No. 824,120, 8-12-77, now abandoned.

This invention relates to apparatus for discharging articles from the article-conveying run of an endless belt conveyor. Such systems are used for sorting or distributing articles which are placed on the conveyor at a receiving station and which are discharged individually at selected discharge stations. Conveyor systems of this type can be used in truck terminals, baggage systems at airports, shipping rooms and in factories where various products require the carrying on of different types of manufacturing procedures and a main conveyor discharges them at different stations. When an article on the conveyor approaches its designated discharge station, a diverter is swung across the conveyor in the path of that article and the article is diverted or pushed off the edge of the conveyor, for example, into a chute or onto a transverse conveyor or a holding platform.

Referring to the drawings:

FIG. 4 is a view on the line IV—IV of FIG. 3;

FIGS. 5 and 6 are views similar to FIGS. 3 and 4, respectively, showing another embodiment of the invention and with FIG. 6 being on line VI of FIG. 5; and, FIG. 7 is a simplified view similar to FIG. 3 and showing another embodiment of the invention.

Figure 1:
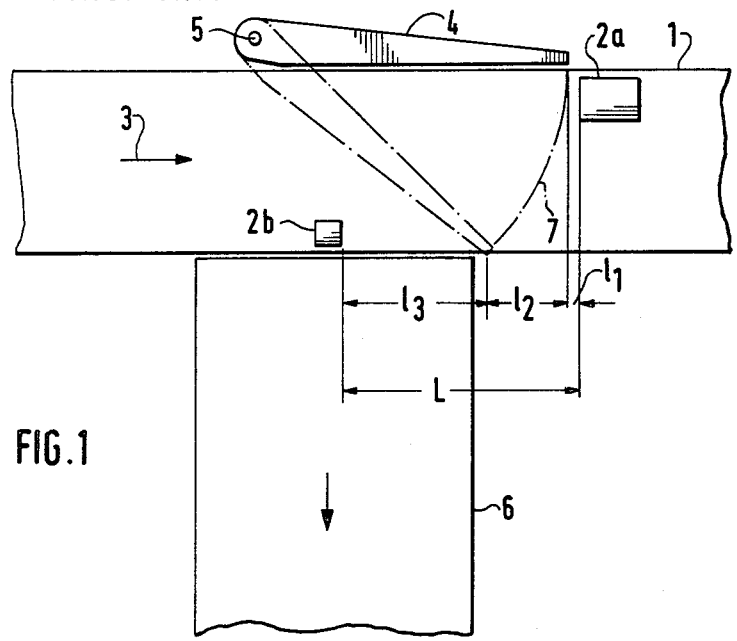
FIG. 1 is a schematic representation of a prior art diverter apparatus.

Referring to FIG. 1 of the drawings, a steel belt conveyor 1 has had articles 2a and 2b loaded onto its article-conveying run at a receiving station (not shown), and the articles are moving downstream on the conveyor and are discharged at the respective designated receiving stations. A diverter 4' is positioned at the discharge station shown, and similar diverters are positioned at the other discharge stations along the conveyor. Throughout this specification and the following claims, the words "upstream" and "downstream", and words having similar connotations, are used in relation to the movement of the conveyor run carrying articles.

FIG. 1 shows a prior art system in which article 2a is being carried by the conveyor to be discharged at a station beyond the station shown, but article 2b is to be discharged into a discharge chute 6 at the station shown. Diverter 4' is mounted upon a pivot shaft 5' to swing between the full-line retracted position and the broken-line extended position in which it diverts articles from the belt. Hence, diverter 4' is positioned out of the path of article 2a but is about to be swung to its extended position so that it will divert article 2b beyond the edge of the belt and into chute 6.

In article-sorting and distributing systems of this type, it is necessary to space the articles a predetermined longitudinal distance between the articles on belt 1 to permit the selective removal of the articles at discharge stations. For example, it is necessary to remove article 2a but not article 2b from the belt into chute 6, so that diverter 4' must start to operate only after the rear end of article 2a has passed the forward or downstream end of diverter 4'. That distance of the conveyor movement is designated $l_1$. When the diverter 4' is pivoted to the extended position, the forward end of diverter 4' moves backwardly or upstream as shown by the arc 7, and that backward movement is $l_2$. Furthermore, as will be discussed below, the diverter must move relatively slowly so that the belt moves an appreciable distance while the diverter is being pivoted from its retracted position to the extended position. During that movement of the diverter, article 2b moves the distance $l_3$. Thus, in order to enable the diverter to move out and discharge article 2b after the article 2a has passed, it is necessary to provide not less than the sum of $l_1$, $l_2$ and $l_3$, which is L, between the trailing end of each article and the leading end of the next article. Therefore, the carrying capacity of the conveyor, or number of articles which can be carried and sorted per unit time, is determined by the minimum distance L which must be maintained between the articles on the belt. In other words, the sorting or carrying capacity of the system can be increased if the minimum distance L can be decreased.

It is an object of the present invention to improve the capacity of article-conveying and sorting systems of the type described above. As will be explained below, that is accomplished by reducing the distance $l_2$, or even making it a "negative value" to thereby reduce L to a value less than the total of $l_1$ and $l_3$.

Figure 2:
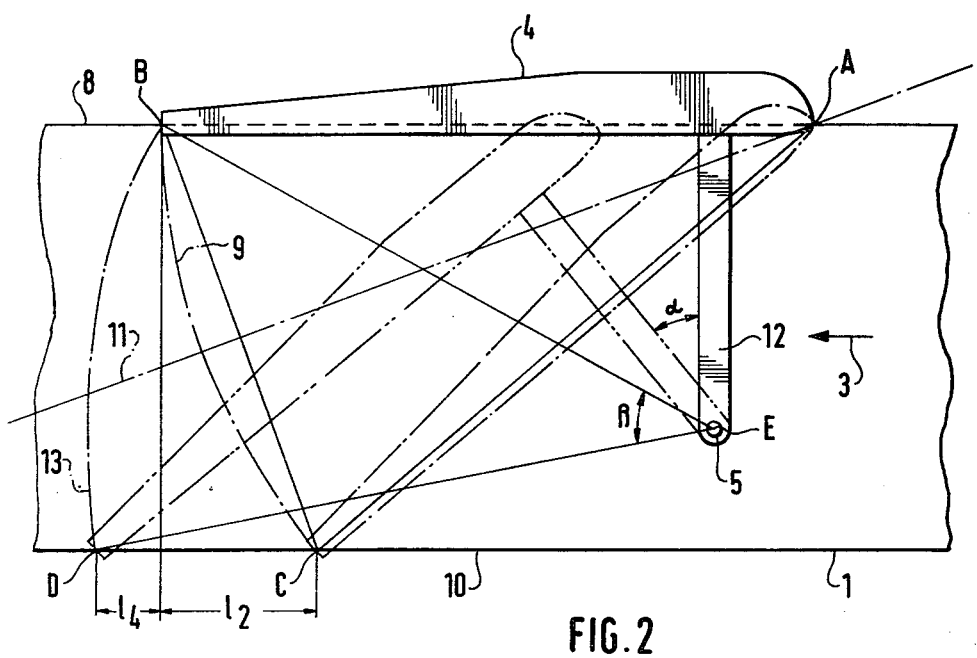
FIG. 2 is a schematic view which is used for explaining the principles of the present invention.

The principle of the present invention will be discussed by referring to FIG. 2. With diverter 4" pivoted at A, as in the prior art, so as to swing from the retracted full-line position A-B to the broken-line position A-C, its forward or free end moves along the arc 9 with the upstream movement of $l_2$. As illustrative of the present invention, assume that diverter 4" is mounted upon an arm 12" pivoted at E upon a shaft 5", and with arm 12" extending transversely of the belt when the diverter is in its retracted position. When the diverter is then swung from its full-line retracted position through the angle so that the diverter and its arm 12" are positioned as shown in the broken-line extended position, the forward end of the diverter moves along an arc 13 between points B and D. Point D is downstream a distance of $l_4$ with respect to point B. Hence, the distance $l_2$ is completely eliminated and there is a downstream movement of the tip of the diverter which is advantageous for some conditions of design and operation. As will be explained below, the pivot axis for the movement of the diverter can be so arranged as to cause the diverter to swing across the belt in such a way that point D is exactly opposite point B, or it can be slightly upstream or downstream, as desired.

Referring to the embodiment of FIGS. 3 and 4, pivot shaft 5 is located below the top run of an endless steel belt 14 of a conveyor 1. The location of the axis 15 of the pivot 5 is such that the angle of the pivotal movement is less than ninety angular degrees, and axis 15 is located at the side of the bisector line 11 of the angle Ab-AC and is closer to the belt edge 10 than to belt edge 8.

Shaft 5 (see FIG. 4) is rotatably supported by a bearing 17 which is fixed to the conveyor frame 16. An arm 12 interconnects shaft 5 and diverter 4 through a vertical shaft 18 fixed to arm 12 and diverter 4 by press fits. One end of arm 12 is fixed to the shaft, and the other end is fixed to the pivot 5 by press fits. The drive means for pivoting diverter 4 comprises an electric motor 20 having a speed reduction means and fixed to frame 16, and crank-arm unit 21 for converting the rotational movement of motor 20 into a reciprocal pivotal movement of a predetermined angular degree α around pivot 5. Unit 21 comprises a circular disc 22 fixed to the reduced speed output shaft of the electric motor 20, a crank pin 23 mounted on the peripheral portion of disc 22, an arm 25 having a bearing 24 at one end in which pin 23 is journalled, and a bearing 26 journalled on a pin 27 which is journalled at its other end in a bracket 28 extending from arm 12.

Thus, when disc 22 is rotated by motor 20 (FIG. 3) in the direction of the arrow 29, shaft 5 is reciprocated about its pivot through the angle α, acting through the arms 25 and 28. Since shaft 5 is fixed relative to diverter 4 through arm 12 and shaft 18, when shaft 5 is pivoted, diverter 4 is pivoted between its solid-line retracted position and its broken-line extended position.

Figure 6:
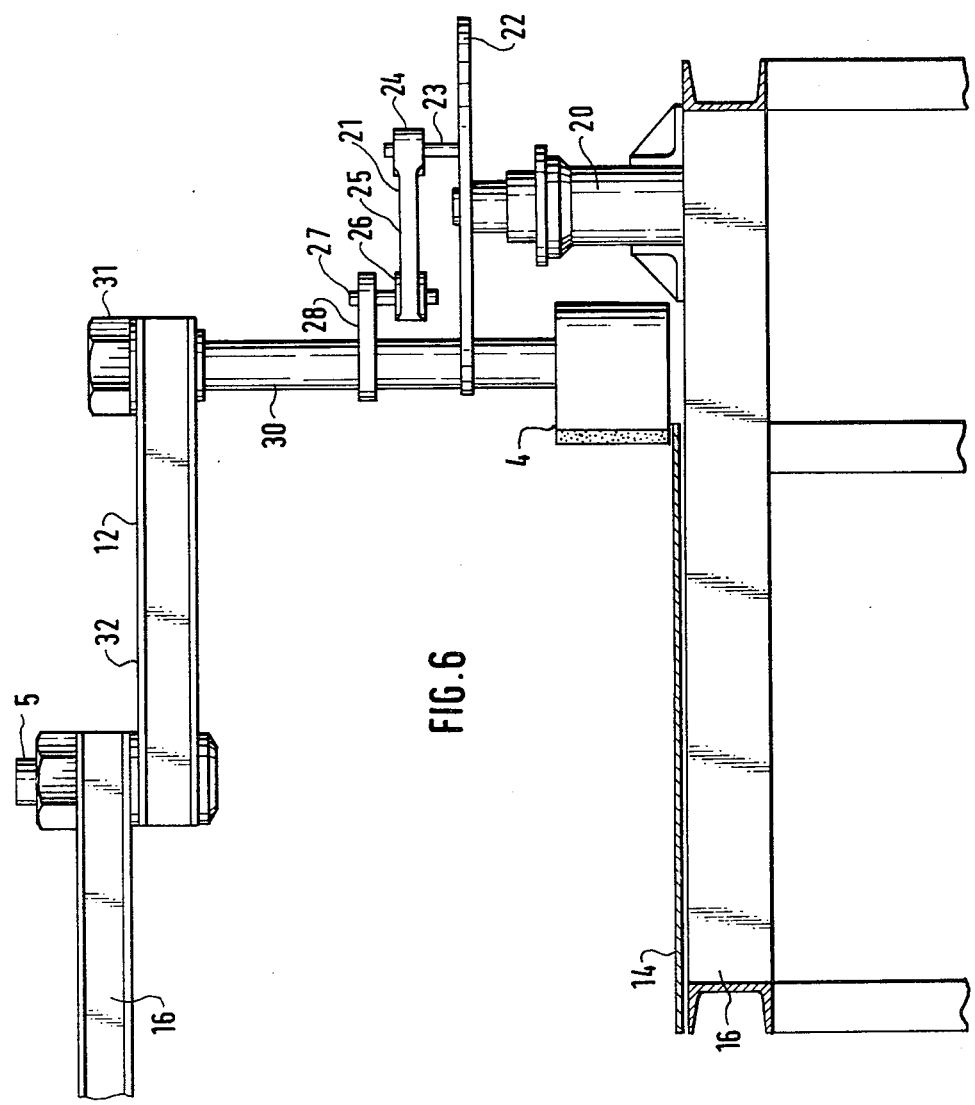

Referring now to the embodiment of FIGS. 5 and 6, shaft 5' is located above belt 14 and supported by frame 16. The position or location of the axis 15' of shaft 5' satisfies the conditions as above described. Pivoted on shaft 5' is an arm 32 which is attached to a shaft 30 which extends downwardly and is fixedly connected to the diverter. Arm 32 is fixed to the shaft 30 by a nut 31 on the threaded end of the shaft.

Figure 3:
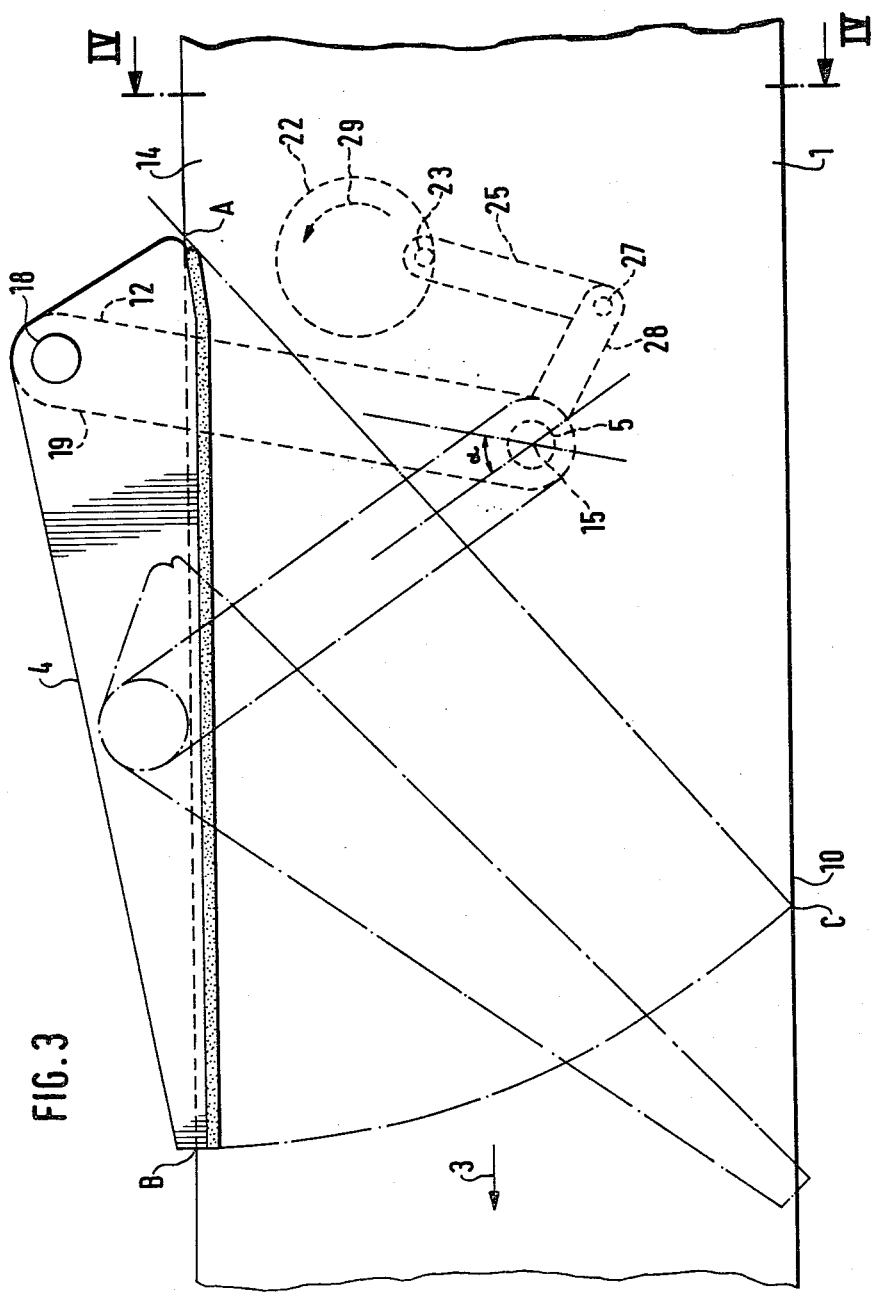
FIG. 3 is a plan view of an article discharging system constituting one embodiment of the present invention.

The means for driving diverter 4 is similar to that of the embodiment of FIGS. 3 and 4, but it has an arm 28 fixedly connected to shaft 30 above diverter 4, and shaft 30 is reciprocated by arm 28.

An important feature of the embodiment of FIGS. 5 and 6 is that pivot 5 is located in alignment with the rear or upstream end portion of the diverter (FIG. 5), with arm 32 extending transversely of the belt. With that arrangement, when diverter 4 is pivoted from its full-line retracted position into its broken-line extended position, the initial movement of the diverter is from belt edge 8 toward belt edge 10. Hence, the entire diverter unit does not move away from the conveyor belt and then back again as occurs when the pivot 5 is downstream from the upstream end of the diverter. Therefore, the transverse position of arm 32 reduces the distance which the diverter moves and the diverter surface effects a more expeditious article-discharge operation.

Referring now to FIG. 7, there is shown an embodiment which is the same as that of FIGS. 3 and 4 except as shown, and as now will be explained. Arm 19 is pivoted on shaft 5 and is rigidly attached to diverter 4, It should be noted that arm 19 extends upstream from shaft 5 at an angle of one-half α when the diverter is in the retracted position. When the diverter swings to its extended position, arm 19 moves through an angle α so that it is then at an angle of one-half downstream with respect to the axis of shaft 5. That arrangement permits the diverter to be pivoted closer to edge 8 of the belt.

Referring again to FIG. 2, the angle between lines A-B and A-C is bisected by a line 11, and as a general rule the pivot axis should be between line 11 and belt edge 10, and at the center of the belt or between there and the belt edge. When arm 12" is at an angle to the diverter so that it extends upstream when the diverter is in its retracted position, the arc followed by the downstream end of the diverter has a greater radius than when arm 12" is at right-angles to the diverter. That produces a flatter arc 13 and a smaller relative value of $l_2$. When the pivot axis is downstream from the upstream end of the diverter with the diverter in its retracted position (as in FIG. 7), that arcuate path of the diverter tip has a shorter radius and the relative value of $l_2$ is increased.

The action of the diverter in discharging articles from the conveyor involves a "plow effect" whereby, when an article on the belt moves into contact with the diverter, the article is deflected toward the edge of the belt as a result of the movement of the belt exerting the downstream movement forces through the bottom surface of the article. The extent of the diverting action depends upon the angle of the diverting face of the diverter with respect to the direction of the belt movement. The diverter also exerts impact and pushing effects upon the article when the article is engaged while the diverter is swinging toward its extended position. For example, if an article is near the downstream tip of the diverter when it is engaged by the diverter, the article may be discharged immediately upon the diverter reaching edge 8 principally by the impact and pushing actions. However, if the diverter does not encounter the article while moving toward its extended position, the article is removed solely by the interaction between the article and the diverter surface resulting from the movement of the belt, as discussed above.

The diverter must be moved to its extended position at a rate which will not result in the articles being damaged by impact when the diverter engages them. That creates a minimum limit on the distance $l_2$ for a given rate of belt movement. That is, assuming that the belt is moved at a predetermined rate, the distance $l_2$ will be increased when the swinging movement of the diverter is decreased.

It will be appreciated that the length of the diverter must be such as to insure the discharge of articles within the prescribed discharge zone, and that the range of sizes of articles carried by the conveyor should be considered in determining the diverter dimensions.

It is understood that changes can be made in the construction and operation of the embodiments disclosed above within the scope of the claims.

What is claimed is:

1. In a conveyor system wherein articles are placed upon the article-conveyor run of a conveyor belt and are moved along a path which extends past a plurality of discharge stations at which the articles are selectively discharged from the conveyor, article-discharging means at one of said stations comprising a diverter which is adapted to be moved between a retracted position adjacent one edge of but outside said path of said belt and an extended position wherein it presents an article-diverting surface extending across said path substantially between the side edges of said belt at an angle to the direction of belt movement whereby articles being carried by the belt along said path are diverted by said diverter from said belt beyond the other edge of said path, mounting means for said diverter and providing support for said diverter when moving between said retracted position and said extended position with the movement being pivotal with respect to a vertical axis which is between said side edges of said belt and spaced from said one edge of said belt and remote from the downstream end of said diverter, wherein said axis is positioned transversely of said run of said belt with respect to the upstream end of said diverter, a pivot arm rigidly fixed to said diverter adjacent said upstream end, and which includes a vertical shaft extending upward from said pivot arm and providing mounting means therefor, a support arm for said shaft fixed to the other end thereof and extending horizontally to said pivotal axis above said article-conveyor run and pivot means mounted at said pivot axis and providing pivotal support for said pivot arm.

2. Apparatus as described in claim 1, wherein said axis is positioned transversely of said belt with respect to the upstream end of said diverter, and which includes a pivot arm rigidly fixed to said diverter adjacent said upstream end.

3. Apparatus as described in claim 2, wherein said arm extends at substantially right angles to said article-diverting surface of said diverter.

4. Apparatus as described in claim 1, which includes an electric motor having a vertical axis, a crank arm assembly operatively connected to said motor, and means mechanically connecting said crank arm assembly to said mounting means for said diverter to transmit reciprocating movement from said crank arm assembly to said diverter.

5. Apparatus as described in claim 4, wherein said motor and crank arm assembly are mounted beneath said conveyor run, and wherein said diverter is supported by means extending upwardly adjacent said one edge of said belt.

6. Apparatus as described in claim 4, which includes pivot means beneath said conveyor run and providing said pivot axis, and a pivot arm extending horizontally from said pivot means beyond said one edge of said belt.

7. Apparatus as described in claim 2, wherein said pivot arm extends horizontally from said diverter at an angle which is less than ninety degrees from said edge of said belt.

8. Apparatus as described in claim 7, wherein said pivotal axis is upstream with respect to the juncture of said diverter and said pivot arm.

9. Apparatus as described in claim 7 wherein said pivotal axis is downstream with respect to the juncture of said diverter and said pivot arm.

10. Apparatus as described in claim 1 wherein said shaft extends vertically from said diverter with the upper end of said shaft being fixed to said diverter and with the other end thereof being fixed to said support arm, said support arm being mounted to swing through an angle $\infty$ during said pivotal movement of said diverter between an upstream position in which said diverter is in said retracted position, and a downstream position in which said diverter is in said extended position, and wherein said angle $\infty$ is bisected by a vertical plane through said axis which is transverse to the direction of movement of said belt.

11. Apparatus as described in claim 1 wherein said support arm extends beyond said one edge of said path of said belt and wherein it swings from a position in which it extends from said axis toward said one edge of said belt and upstream with respect to the movement of said belt to a position wherein it extends at an angle which is downstream with respect to said movement.

* * * * *